(12) United States Patent
Faust et al.

(10) Patent No.: US 12,540,994 B2
(45) Date of Patent: Feb. 3, 2026

(54) CAPTURING MAGNETIC RESONANCE IMAGE DATA

(71) Applicant: Siemens Healthcare GmbH, Erlangen (DE)

(72) Inventors: Jonas Faust, Erlangen (DE); Peter Speier, Erlangen (DE); Florian Maier, Buckenhof (DE)

(73) Assignee: Siemens Healthineers AG, Erlangen (DE)

( * ) Notice: Subject to any disclaimer, the term of this patent is extended or adjusted under 35 U.S.C. 154(b) by 190 days.

(21) Appl. No.: 18/240,610

(22) Filed: Aug. 31, 2023

(65) Prior Publication Data

US 2024/0069137 A1    Feb. 29, 2024

(30) Foreign Application Priority Data

Aug. 31, 2022   (EP) .................................... 22193093

(51) Int. Cl.
*G01V 3/00* (2006.01)
*G01R 33/48* (2006.01)
(Continued)

(52) U.S. Cl.
CPC ..... *G01R 33/5614* (2013.01); *G01R 33/4828* (2013.01); *G01R 33/5608* (2013.01)

(58) Field of Classification Search
CPC .............. G01R 33/5608; G01R 33/385; G01R 33/4824; G01R 33/4828; G01R 33/50; G01R 33/561; A61B 5/4312; A61B 5/004
(Continued)

(56) References Cited

U.S. PATENT DOCUMENTS

| | | | |
|---|---|---|---|
| 10,175,331 B2 * | 1/2019 | Beck ................... | G01R 33/4818 |
| 2015/0309133 A1 * | 10/2015 | Sun ..................... | G01R 33/5614 |
| | | | 324/309 |
| 2020/0085381 A1 | 3/2020 | Weine et al. | |

FOREIGN PATENT DOCUMENTS

EP    3799063 A1    3/2021

OTHER PUBLICATIONS

JP H02144037 A ( No Name ) (Year: 1990).*
(Continued)

*Primary Examiner* — Walter L Lindsay, Jr.
*Assistant Examiner* — Frederick Wenderoth
(74) *Attorney, Agent, or Firm* — Banner & Witcoff, Ltd.

(57) ABSTRACT

Capturing MR image data of an examination object using an MR apparatus, including: performing a balanced steady-state free precession sequence with phase progress of 180 degrees per repetition time using the MR apparatus; in the balanced steady-state free precession sequence, providing a white-marker gradient in order at least partially to balance a dephasing caused by a magnetic-field-changing object in the examination object; capturing image data of the examination object using the MR apparatus at an echo time; and adjusting a phase development between phase magnetization of a first and second materials, which form an interface in the examination object, in the balanced steady-state free precession sequence using the MR apparatus, wherein due to the adjusting of the phase development before an effect of the white-marker gradient, a co-phasal alignment of a magnetization of the first material and of the second material at the interface is effected at the echo time.

7 Claims, 9 Drawing Sheets

(51) Int. Cl.
*G01R 33/56* (2006.01)
*G01R 33/561* (2006.01)

(58) Field of Classification Search
USPC .................................................. 324/309
See application file for complete search history.

(56) References Cited

OTHER PUBLICATIONS

JP S63286141 A (No Name2) (Year: 1988).*
AI_Overview.pdf (Year: 2025).*
Weine J. et al: "Interleaved White Marker Contrast with bSSFP Real-Time Imaging for Deep Learning based Needle Localization in MR-Guided Percutaneous Interventions."; Proceedings of the 27th Annual Meeting of ISMRM, Montreal, 2019, XP040711217.
Dephased MRI, Chris J.G. Bakker et al.; Chris J.G. Bakker et al., "Dephased MRI" Magnetic Resonance in Medicine 55:92-97 (2006); 2006.
CRC Press, CRC Handbook of Chemistry and Physics (65th ed.).; 8 pgs., 2009-2010.
J. H. Seppenwoolde et al: "Passive Tracking Exploiting Local Signal Conservation: The White Marker Phenomenon", Magnetic Resonance in Medicine, vol. 50, pp. 784-790 (2003); 2003.
Sunil Patil et al: "Echo-Dephased steady state free precession", Magnetic Resonance Materials in Physics, Biology and Medicine, Chapman and Hall, London, GB, Bd. 22, Nr. 5, 16. Mai 2009 (May 16, 2009), pp. 277-285, XP019744854.
Koktzoglou I. et al: "Dephased FLAPS for improved visualization of susceptibility-shifted passive devices for real-time interventional MRI", Phys.Med.Biol. 52 (2007), pp. N277-N286; 2007.
Scheffler K. et al.: "Is TrueFISP a gradient?echo or a spin?echo sequence ?. " Magnetic Resonance in Medicine: An Official Journal of the International Society for Magnetic Resonance in Medicine 49.2 (2003): 395-397.
Gosselin M.C. et al.: "Development of a new generation of high-resolution anatomical models for medical device evaluation: the Virtual Population 3.0." Physics in Medicine & Biology 59.18 (2014): 5287.
Bieri, Oliver et al. "Fundamentals of Balanced Steady State Free Precession MRI"; in: Journal of Magnetic Resonance Imaging; vol. 38; pp. 2-11; 2013 // DOI:10.1002/jmri.24163.
Campbell-Washburn et al, "Dual echo positive contrast bSSFP for real-time visualization of passive devices during magnetic resonance guided cardiovascular catheterization", 1-7, Magn Reson. Oct. 28, 2014;16:88. doi: 10.1186/s12968-014-0088-7.; 2014.

* cited by examiner

FIG 9C $fS = 1/2(fLarmor(H2O) + fLarmor(F))$

FIG 9B $fS = fLarmor(H2O)$

CAPTURING MAGNETIC RESONANCE IMAGE DATA

TECHNICAL FIELD

The present disclosure relates to a method for capturing magnetic resonance image data of an object under examination using a magnetic resonance apparatus. The disclosure is further directed at a corresponding magnetic resonance apparatus.

BACKGROUND

Magnetic resonance apparatuses are imaging apparatuses that use a strong external magnetic field to align the nuclear spins of an object to be examined and to excite them by applying a radio-frequency excitation pulse for precession about the corresponding alignment. The precession or transition of the spins from this excited state to a state with less energy generates in response an electromagnetic alternating field that can be detected as an MR signal via receiver antennas.

With the help of magnetic gradient fields, a position encoding can be impressed on the signals, which then allows the signal received to be assigned to a volume element of the object under examination. The received signal can then be evaluated, in order, for example, to provide an image representation of the object under examination.

Objects, for example, made of a paramagnetic material situated in the object under examination can change a magnetic field in an area surrounding the object because of a magnetic susceptibility deviating from a surrounding material. As a result, the magnetic field in an area surrounding the object can have local magnetic field gradients caused by the object. Because of the field gradients, various local phase changes may take place in the area surrounding the object during a repetition time. The locally induced field inhomogeneities can mean that protons inside a volume element of a voxel are magnetized in antiphase, as a result of which a signal attenuation of a signal assigned to the voxel may occur. In order at least to be able to reduce the signal attenuation, it is common, during the sequence, to provide an additional gradient in order at least partially to balance the dephasing caused by the magnetic-field-changing object in the object under examination. This gradient is also known as a white-marker gradient. By providing the white-marker gradient, magnetic-field-changing objects can be made visible. The tissue in the area immediately surrounding the objects generates signals which cause high-intensity image regions, known as artifacts, in the imaging. Because of their intensity, the artifacts stand out from the surrounding area. The surrounding area, which is distinguished by a homogeneous magnetic field, is, in this case, dephased by the white-marker gradient. This provision of a white-marker gradient is also referred to as dephased magnetic resonance image generation. White-marker gradients can be used, for example, in gradient echo sequences. A white-marker contrast can be generated by providing an extra gradient or omitting, reducing, and/or varying rephasing gradients typical of the sequence. The rephasing gradient can, for example, be a rephasing of a slice selection gradient, as described in Seppenwoolde et al. (2003) (SEPPENWOOLDE, Jan-Henry; VIERGEVER, Max A.; BAKKER, Chris JG. Passive tracking exploiting local signal conservation: the white marker phenomenon. Magnetic Resonance in Medicine: An Official Journal of the International Society for Magnetic Resonance in Medicine, 2003, vol. 50, no. 4, pp. 784-790). Increasing signal strengths using the white-marker gradient is impossible in spin echo sequences. The reason for this is that because of the excitation of the object under examination for the phase change by 180 degrees, the dephasing introduced by the local field inhomogeneities would be reversed. In spin echo sequences, no artifact that could be rephased is produced since the 180-degree pulse already balances the dephasing by the field inhomogeneities around the object.

A particular sequence form is a balanced steady-state free precession sequence, bSSFP for short. In this case, it is provided that, as with gradient echo sequences (GRE), magnetic field gradients are provided to generate echo signals. However, these are balanced out during a repetition time. Because of local field inhomogeneities, signal loss may occur close to the magnetic-field-changing object, as with the gradient echo sequences. The particular signal generation in the bSSFP can here result in an alternating phase at the echo time TE in a voxel, wherein this causes destructive interference to the spins. The particular signal generation in bSSFP imaging results in a rephasing of the spins at the time TE=TR/2, which balances the dephasing by local field inhomogeneities. The bSSFP sequence can, therefore, also be described as a "spin-echo-like" sequence. The crucial difference, however, is that the phase to which the spins rephase is dependent on the phase progress thereof in the period TR, in other words, the period between two excitation pulses. If this lies between $(2n-1)*pi$ and $(2n)*pi$, where n is a natural number, the spins rephase with an opposite phase to the spins with a phase progress between $(2n)*pi$ and $(2n+1)*pi$, where n is a natural number including zero. Thanks to the strong local field gradients in the immediate vicinity of a magnetic-field-changing object, which results in a locally varying accumulated spin phase during TR, the spins inside a voxel can rephase at the time TE with an alternating phase and destructively interfere with the signals. As with gradient echo sequences, a white-marker gradient can partially balance this signal attenuation.

Using a white-marker gradient can unintentionally cause increased signal intensities at interfaces between different materials. This occurs, for example, at interfaces between fat and other tissue. The increased signal intensities result from different resonance frequencies of the protons in water in the tissue and of the protons in fat. The frequency difference between the resonance frequency of the protons in water and the resonance frequency of the protons in fat is 225 Hz with an external field strength of 1.5 tesla. Suppose the water and fat protons are in the same volume element. In that case, the deviation between the resonance frequencies results in a phase difference between the water and fat protons once the protons have been deflected.

At the start of the deflection of the magnetization from the longitudinal to the transversal and of the transversal relaxation, the water protons and the fat protons are in phase. Because of the different resonance frequencies, the phase of the water protons changes more strongly than the phase of the fat protons. As a result, both the proton groups are out of phase and, in the case of a magnetic field strength of, for example, 1.5 tesla after a first echo time of 2.2 msec after the excitation are aligned oppositely. Because of the opposite alignment of the protons in the volume element there is a destructive superimposition of the respective signals, as a result of which the resulting signal of the volume element has a weak intensity at the first echo time. After a second echo time of 4.4 msec, the difference in the phases between the water protons and the fat protons is 0 degrees, so both proton groups are in phase. As a result, there is a constructive superimposition, as a result of which the intensity of the signal of the volume element is increased. In gradient echo imaging, the signal is canceled or attenuated at the first echo time. The signal is constructively superimposed at the second echo time, k, and the intensities are added. Likewise, destructive interference may occur at interfaces in bSSFP sequences. After the steady state formation in the bSSFP after multiple TRs, the water and fat protons are no longer in phase at the start of TR. Depending on the sequence configuration (choice of repetition time), these can have an opposite phase at the time TE=TR/2, since this is, as described above, depending on the phase accumulated during TR, either 0 or 180 degrees. In other words, if the spins of two materials at interfaces are out of phase at the echo time, a white-marker gradient can bring them partially back in phase and thus generate signal intensity.

The additional white-marker gradient means that a magnetization in the tissue of a homogeneous magnetic field is dephased. The white-marker gradient, however, reduces the dephasing in inhomogeneous regions. This means that tissue regions of a homogeneous magnetic field are reduced in intensity, and at the same time, tissue regions of an inhomogeneous magnetic field are increased in intensity.

When a white-marker gradient is provided, there is a further change in the signal intensity at the interfaces, as described above. When the white-marker gradient is provided in the sequence, it may be the case when a fat tissue is present that the signal intensity at volume elements at the interface between fat tissue and further tissue increases. As a result, not only is the signal intensity in the area surrounding the magnetic-field-changing object increased, but also the signal intensity along the interfaces. However, this can be undesirable if an enhanced presentation of the magnetic-field-changing object is provided in the imaging and an increased signal intensity at interfaces is undesirable.

SUMMARY

It is thus an object of the disclosure to reduce a signal intensity at interfaces in dephased balanced steady-state free precession sequences.

A first aspect of the disclosure relates to a method for capturing magnetic resonance image data of an object under examination using a magnetic resonance apparatus. In a first step of the method, it can be provided that a balanced steady-state free precession sequence is performed thanks to the magnetic resonance apparatus. The steady-state free precession sequence relates to a magnetic resonance imaging sequence, which is structured such that a phase coherence of a transversal magnetization between the excitation times is, in part, maintained. In the balanced SSFP, the sequence is designed to balance all gradient dephasing moments prior to the next excitation pulse. It is provided that thanks to the sequence, a phase progress of 180 degrees per repetition time is affected by the magnetic resonance apparatus using an excitation pulse. In the bSSFP sequence, a white-marker gradient is provided in order at least partially to balance a local dephasing caused by a magnetic field-changing object in the object under examination. In other words, thanks to the magnetic resonance apparatus, the white-marker gradient is generated, which attenuates local dephasings caused by the magnetic field-changing object.

Thanks to the magnetic resonance apparatus, image data of the object under examination is captured by the magnetic resonance apparatus at a predetermined echo time. The echo time can, for example, be half a repetition time. In other words, the magnetic resonance apparatus can capture the object's image data under examination in a temporal center of the repetition time. The echo time can also deviate from half the repetition time by, for example, a maximum of 20%, 15%, 10%, or 5% of the repetition time.

It is provided that thanks to the magnetic resonance apparatus, an adjustment of a phase development between a phase of a magnetization of a first material and a phase of a magnetization of a second material is performed. The first and second materials can form an interface in the object under examination. In other words, the materials can have different resonance frequencies, as a result of which the phases of the materials can change differently over time. Because of the different changes in the phases, a phase development between both the phases can take place. The phase development can be structured such that the phase of the first material and the phase of the second material can have a phase difference of 180 degrees at a point in time of the predetermined echo time. As a result, signals that result from the phase of the protons of the first material and signals that result from protons of the second material can be destructively superimposed, as a result of which a signal intensity of a signal from a volume element that contains both protons may be reduced or removed.

The white-marker gradient can result in a change in the phases of the two materials in the volume element. As a result, the phase difference can deviate from 180 degrees at the predetermined echo time. An extent of a destructive superimposition of the signals is thus reduced for the point in time. This results in an increase in the signal intensity in the volume element, in which both the first material and the second material are situated.

This increase in the signal intensity, thanks to the white-marker gradient, may be undesirable at interfaces. Reducing the signal intensity in the volume elements is necessary in this case.

The disclosure provides for the phase development between the phase of the magnetization of the first material and the phase of the magnetization of the second material to be changed such that the phases, without the effect of the white-marker gradient, are co-phasal at the specified echo time. For this purpose, the magnetic resonance apparatus can adjust the phase development prior to the effect of the white-marker gradient having a co-phasal alignment of the magnetization of the first material and the magnetization of the second material at the interface. In general, without the presence of the white-marker gradient in a co-phasal alignment of the materials, there results in an addition of the signal intensities in the volume element, which contains both materials and thus maps an interface of both materials. However, when the white-marker gradient is present, this leads in the situation described to an attenuation of the signal in the said volume element of the interface.

Adjusting the phase position between the phases of both materials thus results in an attenuation of a signal intensity when the white-marker gradient is provided. Without the influence of the phase position, there would be an increase in the signal intensity.

The disclosure has the advantage that thanks to the white-marker gradient, an increase in the signal intensity in a region of a magnetic-field-changing object is enabled without at the same time increasing a signal intensity at an interface between the two materials.

The disclosure also comprises developments, thanks to which further advantages arise.

One development of the disclosure provides that the adjustment of the phase development comprises setting a scanner frequency of the BSSFP sequence. In this case, the magnetic resonance apparatus selects the scanner frequency to be situated in the center between a Larmor frequency of the first material and a Larmor frequency of the second material. The scanner frequency fScanner is produced in accordance with the formula fScanner=0.5*(fLarmor,m1+ fLarmor,m2) from the Larmor frequency of the first material fLarmor,m1 and the Larmor frequency of the second material fLarmor,m2. In other words, the scanner frequency has a value produced by adding the first material's Larmor frequency to the second material's Larmor frequency and dividing the total by 2. The scanner frequency thus lies in the arithmetic average between the Larmor frequency of the first material and the Larmor frequency of the second material. By adjusting the scanner frequency, the object under examination is thus not excited, as normal, with the Larmor frequency of the water, but with a scanner frequency deviating. The change in the scanner frequency means that the phase change over time in the magnetization of the first material is identical to the phase change over time in the magnetization of the second material. However, both materials' directions of the phase change over time are opposite. The magnetization along the interface is thus refocused co-phasally. Because of the co-phasal refocusing of the protons of both materials, the applied white-marker gradient at the interface results in a dephasing instead of in a rephasing of the magnetization, as a result of which the white-marker gradient reduces a signal intensity along the interface.

One development of the disclosure provides that the adjustment of the phase development comprises a provision of an additional phase progress per repetition time of the bSSFP sequence, wherein the following applies for the additional phase progress of the bSSFP sequence: ((fLarmor, m1−fLarmor,m2)/2)×TR×360 degrees. In other words, it is provided that the Larmor frequency of water is used as the scan frequency for the excitation during the sequence. The adjustment of the phase development takes place, in this case, in that during the respective repetition time, a further phase progress is provided, in addition to the provision of the phase progress per repetition time, which is produced by the aforementioned formula. In other words, the value of the phase progress is supplemented by an additional value of the further phase progress. In this case, the additional phase progress depends on the Larmor frequency of the first material and the Larmor frequency of the second material. It is thus provided that the Larmor frequency of the first material continues to be used as the scan frequency and in place of adjusting the scan frequency to change the phase cycle of the excitation pulses to shift the band structure of the sequence relative to the resonance frequencies of the first material and of the second material. Normally it is provided that the sequence effects a phase progress of 180 degrees per repetition time so that the first material has a resonance in the center of the central band, wherein it is assumed that the scan frequency corresponds to the Larmor frequency of the first material. By setting the scan frequency to the resonance frequency of the first material and providing the additional phase progress between the pulses the resonance frequencies are positioned symmetrically in the band structure.

One development of the disclosure provides that the first material is fat, and the second is water. In other words, the method is provided to reduce a signal intensity at an interface between fat and water. The combination is, in particular, relevant to tissue interfaces because interfaces between fat tissue and other tissue can, thanks to the protons in the fat and the protons in the water of the further tissue, cause undesirably high signal intensities in a common volume element. Interfaces between fat tissue and other tissue are particularly relevant in biological examinations.

One development of the disclosure provides that the first material is silicone, and the second is water. In other words, the method is provided to reduce a signal intensity at an interface between water and silicone. The combination is particularly relevant to interfaces between tissue and implants.

For individual applications or application situations that may arise in the method and that are not explicitly described here, it can be provided that in accordance with the method, an error message and/or a request to input user feedback is output and/or a default setting and/or a predetermined initial state is set.

A second aspect of the disclosure relates to a magnetic resonance apparatus for capturing magnetic resonance image data of an object under examination. The magnetic resonance apparatus is designed to provide a balanced steady-state free precession sequence with a phase progress of 180 degrees per repetition time. The magnetic resonance apparatus is designed to provide a white-marker gradient in the sequence in order at least partially to balance a dephasing caused by a magnetic-field-changing object in the object under examination. The magnetic resonance apparatus is designed to capture image data of the object under examination at a predetermined echo time. It is provided that the magnetic resonance apparatus is designed to adjust a phase development between a phase of a magnetization of a first material and a phase of a magnetization of a second material, which form an interface in the object under examination, in the balanced steady-state free precession sequence. It is provided that the adjustment of the phase development, prior to the effect of the white-marker gradient, affects a co-phasal alignment of a magnetization of the first material and of the second material at the interface at the echo time.

Further forms of aspects of the disclosed magnetic resonance apparatus follow from the various forms of aspects of the disclosed method.

In accordance with a third aspect of the disclosure, a computer program is provided, which can be loaded directly into a memory of a control facility of an above-mentioned magnetic resonance apparatus, with program means to execute the steps of the above-mentioned method when the program is executed in the control facility of the magnetic resonance apparatus. Equally, an electronically readable data storage medium with electronically readable control information stored thereon is provided, which comprises at least one computer program of the above type and is configured such that when the data storage medium is used in a control facility of the above-mentioned magnetic resonance apparatus it performs a method of the above type. The system can, in particular, comprise a computer, a microcontroller, or an integrated circuit. Alternatively, the magnetic resonance apparatus can comprise a real or virtual computer group (i.e., cluster). In this exemplary aspect the magnetic resonance apparatus comprises a processor or a computing unit. The computing unit can have hardware elements and/or software elements, for example, a microprocessor or what is known as an FPGA (Field Programmable Gate Array). A memory unit can be implemented as a nonpermanent working memory (RAM) or as a permanent mass storage apparatus (hard disk, USB stick, SD card (SSD)).

A computing unit can, in particular, be understood as a data processing device that contains a processing circuit. The computing unit can, therefore, process data on the performance of computing operations. Where appropriate this also includes operations to perform indexed accesses to a data structure, for example, a look-up table (LUT).

The computing unit can, in particular, contain one or more computers, one or more microcontrollers, and/or one or more integrated circuits, for example, one or more application-specific integrated circuits (ASIC), one or more field-programmable gate arrays (FPGA), and/or one or more systems on a chip (SoC). The computing unit can also contain one or more processors, for example, one or more microprocessors, one or more central processing units (CPU), and one or more graphics processing units (GPU)) and/or one or more signal processors, particularly one or more digital signal processors (DSP). The computing unit can also contain a physical or a virtual group of computers or others of the units mentioned.

In different exemplary aspects, the computing unit contains one or more hardware and/or software interfaces and/or one or more memory units.

A memory unit can be configured as a volatile data memory, for example, as a dynamic random access memory (DRAM) or a static random access memory (SRAM), or as a nonvolatile data memory, for example, as a read-only memory (ROM), as a programmable read-only memory (PROM), as an erasable read-only memory (EPROM), as an electrically erasable read-only memory (EEPROM), as a flash memory or flash EEPROM, as a ferroelectric random access memory (FRAM), as a magnetoresistive random access memory (MRAM) or as a phase-change random access memory (PCRAM).

The at least one evaluation unit, the control facility, and/or the measurement unit of the disclosed magnetic resonance apparatus can contain one or more computing units in accordance with this understanding, or one or more computing units of the magnetic resonance apparatus can contain the at least one evaluation unit, the control facility and/or the measurement unit.

If, in the context of the present disclosure, it is mentioned that a component of the disclosed magnetic resonance apparatus, in particular, the control facility, the measurement unit, or at least one evaluation unit of the magnetic resonance apparatus, is designed, embodied, configured or the like, to execute or implement a particular function, to achieve a particular effect or to serve a particular purpose, this can be understood to mean that the component, over and above the basic or theoretical usefulness or suitability of the component for this function, effect or purpose, is specifically and actually able by a corresponding adjustment, programming, physical configuration and so on to execute or implement the function, to achieve the effect or to serve the purpose.

Unless explicitly specified otherwise, a connection of two electrical or electronic components can be understood to mean that an electrical connection exists between the components or can be created by the actuation of one or more switching elements. In particular, unless otherwise specified, the components can be directly or indirectly connected. In this case, a direct connection can be understood to mean that apart from the optional one or more switching elements, no further electrical or electronic components are arranged between the components. In contrast, an indirect connection can be understood to mean that in addition to the optional one or more switching elements, one or more further electrical or electronic components, for instance, resistors, capacitors, coils, etc., are arranged between the components.

Further forms of aspects of the disclosed computer program follow from the different forms of aspects of the disclosed method and of the disclosed magnetic resonance apparatus.

A fourth aspect of the disclosure relates to an electronically readable data storage medium with electronically readable control information stored thereon, which comprises at least one computer program in accordance with the third aspect of the disclosure and is configured such that when the data storage medium is used in a control facility of a magnetic resonance apparatus in accordance with the second aspect of the disclosure it performs a method in accordance with the first aspect of the disclosure.

Further forms of aspects of the disclosed electronically readable data storage medium follow from the different forms of aspects of the disclosed method, the disclosed magnetic resonance apparatus, and the disclosed computer program.

Further features of the disclosure emerge from the claims, the figures, and the description of the figures. The features and combinations of features mentioned in the description as well as the features and combinations of features mentioned below in the description of the figures and/or features and combinations of features shown in the figures can be comprised by the disclosure not only in the respectively specified combination but also in other combinations. In particular, aspects and combinations of features can also be comprised by the disclosure that does not have all the features of an originally formulated claim. In addition, aspects and combinations of features can be comprised by the disclosure that goes beyond the combinations of features set out in the back references of the claims or deviate.

BRIEF DESCRIPTION OF THE DRAWINGS

The disclosure is explained in greater detail below using specific exemplary aspects and associated schematic drawings. In the figures, identical or functionally identical elements can be provided with the same reference characters. The description of identical or functionally identical elements is appropriate, not necessarily repeated in respect of different figures. In the figures:

FIG. 4 (4A and 4B) shows a schematic representation of an exemplary bSSFP signal formation in the vicinity of a magnetic-field-changing object;

FIG. 5 (5A and 5B) shows a schematic representation of an exemplary bSSFP signal formation around a paramagnetic needle for bSSFP-based sequences without a WM gradient;

FIG. 6 (6A and 6B) shows a schematic representation of an exemplary bSSFP signal formation around a paramagnetic needle for bSSFP-based sequences with a WM gradient;

FIG. 7 (7A-7C) shows a schematic representation of an exemplary analysis of the signal formation in the dephased bSSFP at fat tissue interfaces;

FIG. 8 (8A-8C) shows a schematic representation of an exemplary analysis of the signal formation in the dephased bSSFP at fat tissue interfaces;

FIG. 9 (9A-9C) shows a schematic representation of an exemplary simulation of a virtual human phantom, which contains a virtual paramagnetic needle;

DETAILED DESCRIPTION

Figure 1:
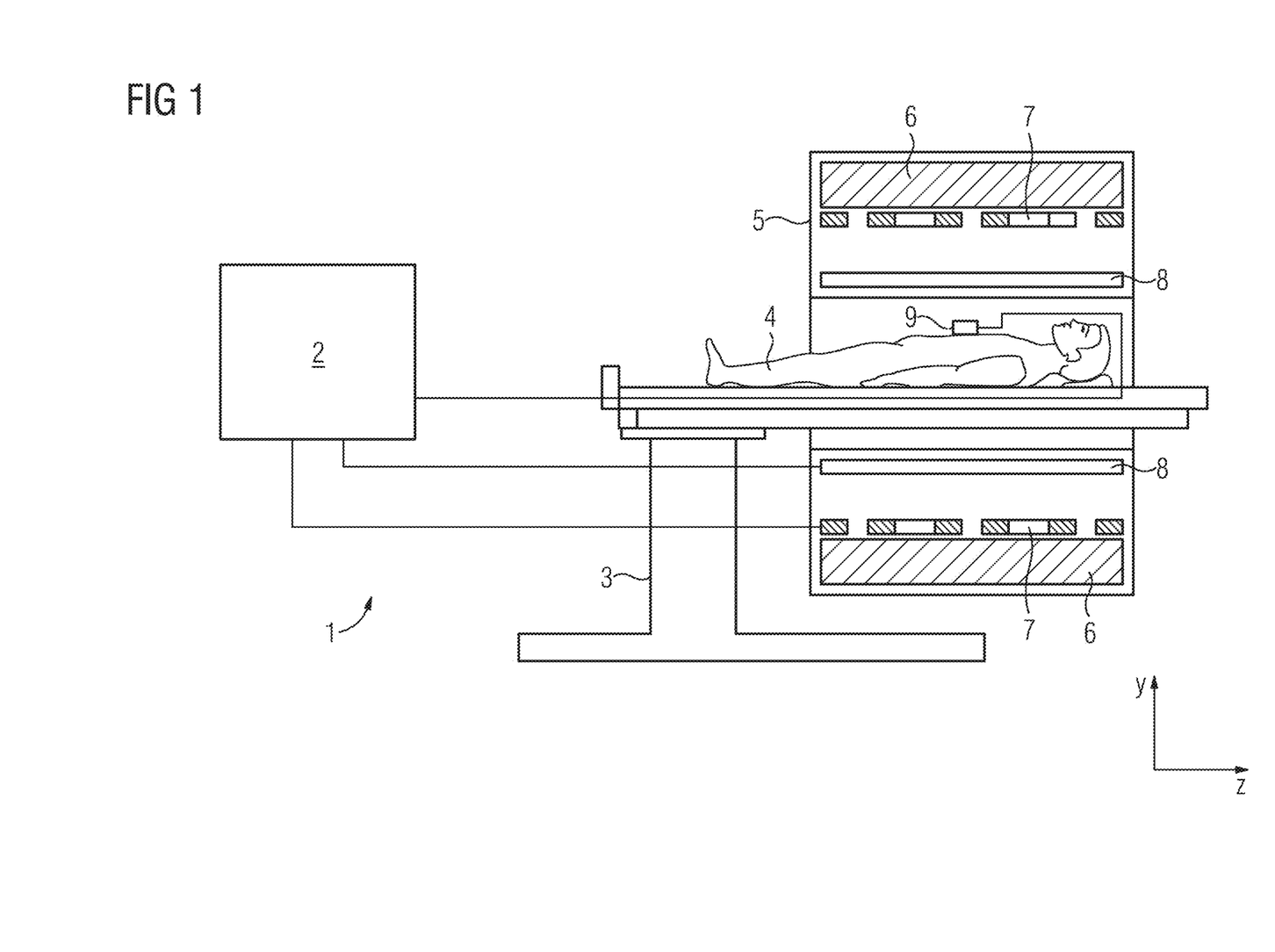
FIG. 1 shows a schematic representation of an exemplary form of aspect of a disclosed magnetic resonance apparatus.

FIG. 1 schematically shows an exemplary aspect of a disclosed magnetic resonance apparatus 1.

The magnetic resonance apparatus 1 comprises a magnetic resonance scanner 5 with a field magnet 6, which generates a static magnetic field for the alignment of nuclear spins of an object under examination 4, for example, of a patient, in an imaging region. The imaging region is characterized by an extremely homogeneous static magnetic field, wherein the homogeneity relates, in particular, to the magnetic field strength or the amplitude thereof. The imaging region is situated in a patient tunnel, which extends in a longitudinal direction Z through the magnetic resonance scanner 5. For example, the field magnet 6 can be a superconducting magnet, which can generate magnetic fields with a magnetic flux density of up to 3 tesla or more. However, permanent magnets or electromagnets with normal-conducting coils can be used for lower field strengths. A patient table 3 can move inside the patient tunnel.

The magnetic resonance scanner 5 further comprises a gradient coil array 7 with multiple gradient coils, which superimpose gradient fields, in other words, magnetic fields, on the static magnetic field in the three spatial directions for the spatial differentiation of the scanned image regions in the imaging region. For example, the gradient coils in the gradient coil array 7 can be designed as coils made of normal-conducting wires, which can generate fields or field gradients orthogonal to one another in the imaging region.

The magnetic resonance scanner 5 comprises a transmission coil array, which can, for example, comprise a body coil 8 as a transmission antenna designed to deliver a radio-frequency signal into the imaging region. The body coil 8 can hence be understood as an RF transmission coil array of the magnetic resonance apparatus 1 or as part of the RF transmission coil array. In some forms of aspects, the body coil 8 can also be used to receive resonant MR signals emitted by the object under examination 4. In this case, the body coil 8 can also be considered as part of a signal-capture apparatus of the magnetic resonance apparatus 1. The signal capture apparatus optionally comprises a local coil 9, which can be arranged in the immediate vicinity of the object under examination 4, for example, on the object under examination 4 or in the patient table 3. The local coil 9 can, alternatively or additionally to the body coil 8 serve as a receiver coil or receiver antenna.

The magnetic resonance apparatus 1 also comprises a control facility 2. The control facility 2 can comprise a receiver control unit which can be regarded as part of the signal capture apparatus and is connected to the body coil 8 and/or the local coil 9. As a function of the MR signals captured, the receiver control unit, which can comprise an analog-to-digital converter (ADC), can generate corresponding MR data, in particular, in the k-space. A computing unit of the control system and computer system can evaluate the MR data and, for example perform an image reconstruction to generate an MRI scan 10 of the object under examination 4.

The control facility 2 comprises a transmitter control unit connected to the body coil 8 and controls it to generate RF pulses, such as excitation pulses and/or refocusing pulses.

The control facility 2 comprises a gradient control unit, which is connected to the gradient coil array 7 and controls it to switch slice selection gradients, gradients for the frequency encoding and/or phase encoding, and/or readout gradients.

It is noted that the structure described in the control facility 2 represents only a nonrestrictive example. The required tasks and functions can also be distributed differently and/or on different control units and/or other computing units.

Figure 2:
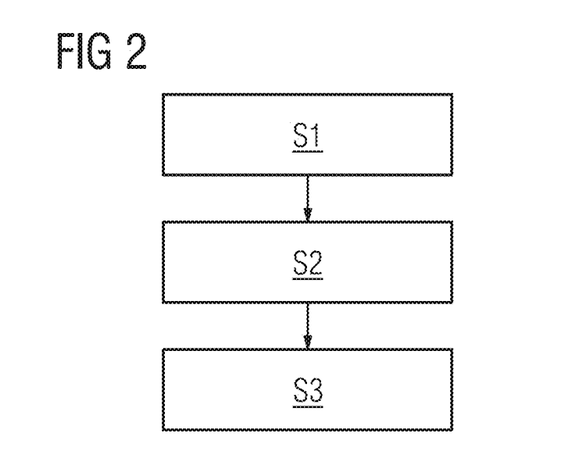
FIG. 2 shows a schematic representation of an exemplary form of aspect of an operational sequence of a disclosed method.

The magnetic resonance apparatus 1 is, in particular, able to perform a method for MRI in accordance with the disclosure FIG. 2 shows a schematic representation of an exemplary form of aspect of an operational sequence of a disclosed method;

The method can be provided for generating an MRI scan 10 of the object under examination 4 by a magnetic resonance apparatus 1.

In a first step, S1 control data for the activation of the magnetic resonance apparatus 1 can be transmitted by a control facility 2 of the magnetic resonance apparatus 1 to activate the magnetic resonance apparatus 1 to perform a balanced steady-state free precession sequence.

The magnetic resonance apparatus 1 can perform the balanced steady-state free precession sequence with a phase progress Φ of 180 degrees per repetition time TR, wherein in the balanced steady-state free precession sequence, a white-marker gradient GWM is provided by the magnetic resonance apparatus 1, in order at least partially to balance a dephasing caused by a magnetic-field-changing object in the object under examination 4.

A second step, S2, can comprise an adjustment by the magnetic resonance apparatus 1 of a phase development between a phase of a magnetization of a first material and a phase of a magnetization of a second material, which form an interface in the object under examination 4, in the balanced steady-state free precession sequence, wherein thanks to the adjustment of the phase development prior to the effect of the white-marker gradient GWM a co-phasal alignment of a magnetization of the first material m1 and of the second material m2 is effected at the interface at the echo time TE.

A third step S3 of the method, can comprise a capture of image data of the object under examination 4 by the magnetic resonance apparatus 1 at an echo time TE. The echo time TE can be half a repetition time TR or can deviate therefrom by a predetermined value. The image data can be evaluated by the control facility 2 to generate an MRI scan 10 of the object under examination 4.

Figure 3:
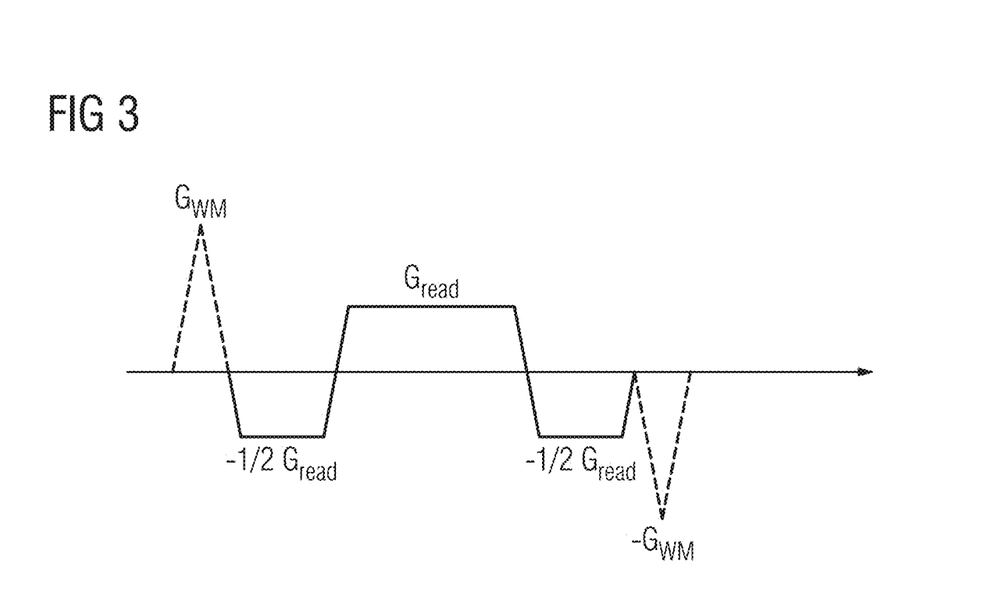
FIG. 3 shows a schematic representation of an exemplary readout gradient of a dephased bSSFP sequence.

FIG. 3 shows a schematic representation of an exemplary readout gradient Gread of a dephased bSSFP sequence.

Balanced steady-state free precession (bSSFP) imaging describes a specific signal formation mechanism in MRI. This signal formation mechanism is characterized in that all magnetic field gradients Gx, Gy, Gz are balanced at the end of each repetition time TR, and a coherent phase relationship exists between consecutive excitation pulses RF. White-marker gradients GWM can be introduced into gradient echo sequences but not spin echo sequences since the phase progress Φ would reverse the introduced dephasing by 180 degrees. Although the bSSFP sequence can be assigned to the type of the spin echo sequence, a combination of the sequence with white-marker gradients GWM is possible since the magnetization at the point in time of half a repetition time rephases either at 0 or 180 degrees, depending on the phase progress thereof during a repetition time.

Field inhomogeneities can thus result in an antiphase magnetization inside a voxel and thus in a signal loss, which can be countered with the help of a white-marker gradient.

What is shown is the pattern of the readout gradient Gread in the dephased bSSFP sequence. All gradient moments are balanced prior to the end of the repetition time TR to achieve a bSSFP signal formation. An additional white-marker gradient GWM introduces an additional phase. In areas with homogeneous susceptibility, the white-marker gradient GWM causes a signal loss because of the introduced dephasing. In the vicinity of magnetic-field-changing objects the white-marker gradient GWM can counter a signal reduction induced by local interference gradients GS caused by a susceptibility difference and thus increase or even restore a signal intensity of a signal.

Figure 4A:
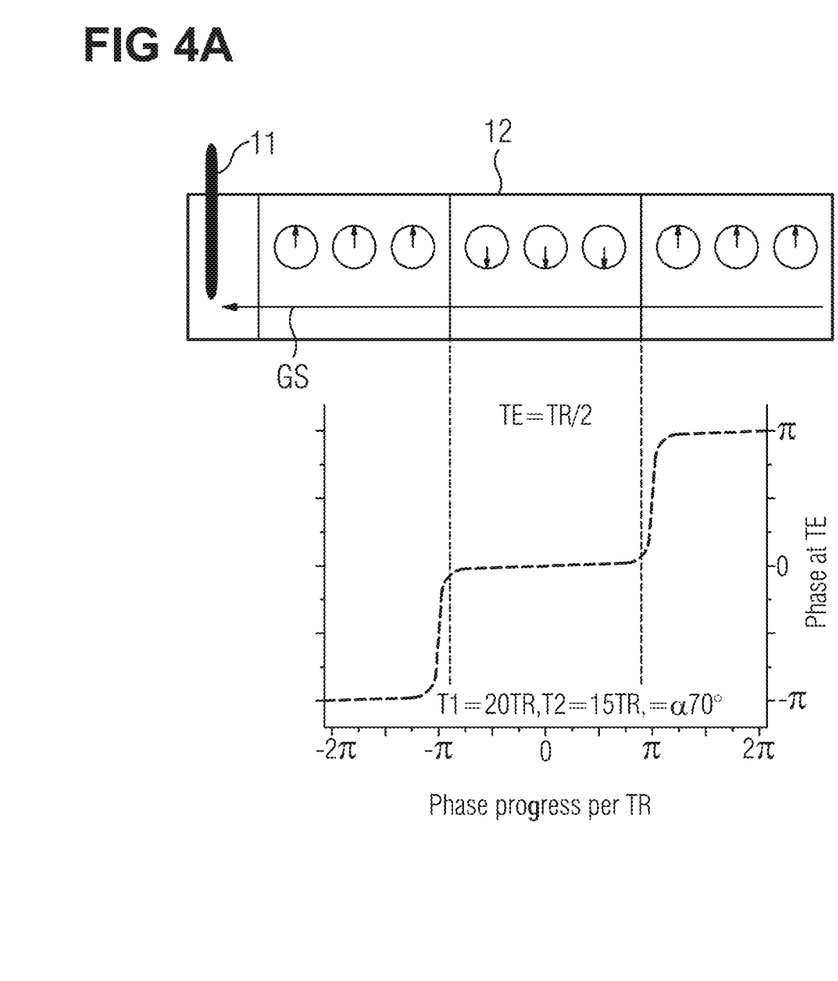
Figure 4B:
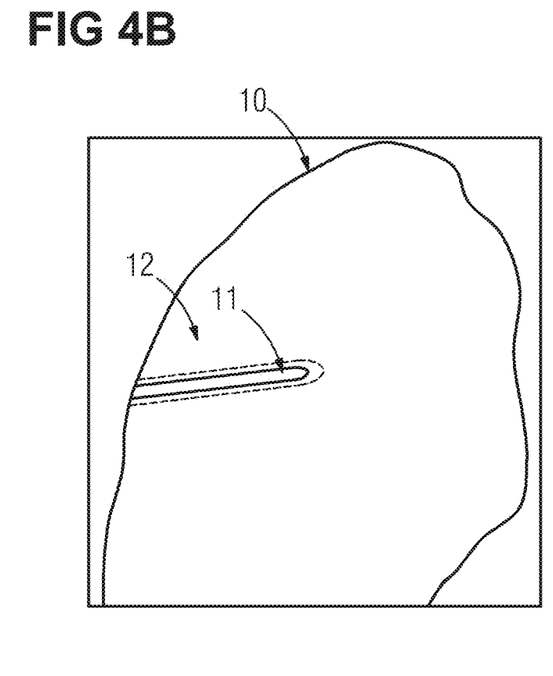

FIG. 4 shows a schematic representation of an exemplary bSSFP signal formation in the vicinity of a magnetic-field-changing object;

FIG. 4a) schematically shows a section through an object under examination 4. A paramagnetic needle 11 is positioned in a tissue 12 of the object under examination 4 as a magnetic-field-changing object on the left-hand side of the MRI scan 10. The needle 11 induces a local interference gradient GS in the magnetic field, which causes a magnetic field in the tissue 12 around the needle 11 to change. This results in a spatially varying phase development during the repetition time TR. Because of the bSSFP signal formation, the magnetization at TR/2 is refocused with a phase of either 0° or 180°, depending on the local phase development. The circles containing the indicators represent the phase of the local magnetization of the protons of the tissue 12 at the echo time TE. The diagram shows the phase at TE against the phase progress per TR.

b) shows an MRI scan 10 of an object under examination 4 around the needle 11, with the contrast generated by the dephased bSSFP. The needle 11 can be introduced into the surrounding tissue 12 of the object under examination 4. The object is characterized by a dark artifact, which can be traced back to a signal loss caused by the refocusing of the intravoxel magnetization at TE with a variable phase, as shown in a), as a result of which a destructive superimposition of signal components occurs.

Because of the magnetic field interference, which is induced around the needle 11, and the resulting magnetization dephasing, the inherent signal formation behavior of the sequence results in an alternating phase at the echo time TE in the magnetization of the tissue 12 around the needle 11. The susceptibility-induced interference gradient GS causes the magnetization to have a spatially dependent resonance frequency (Larmor frequency), which consequently means that the magnetization accumulates a spatially dependent phase during the repetition time TR. The echo is formed at 0 degrees or 180 degrees, depending on this accumulated phase. a) maps the characteristic band structure. If this occurs in the same voxel, the antiphase magnetization is removed, and the signal is lost, which in the MRI scan 10 results in a dark image artifact in the vicinity of the needle 11.

Figure 5A:
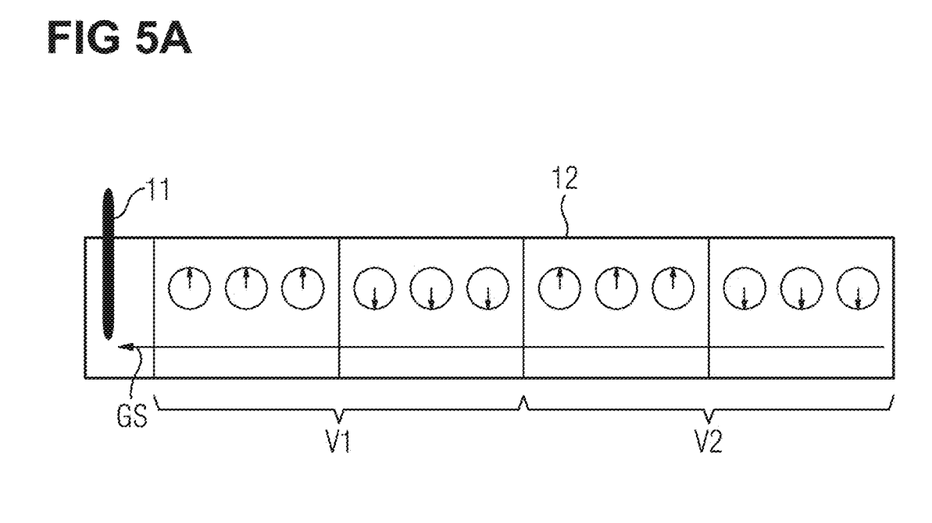
Figure 5B:
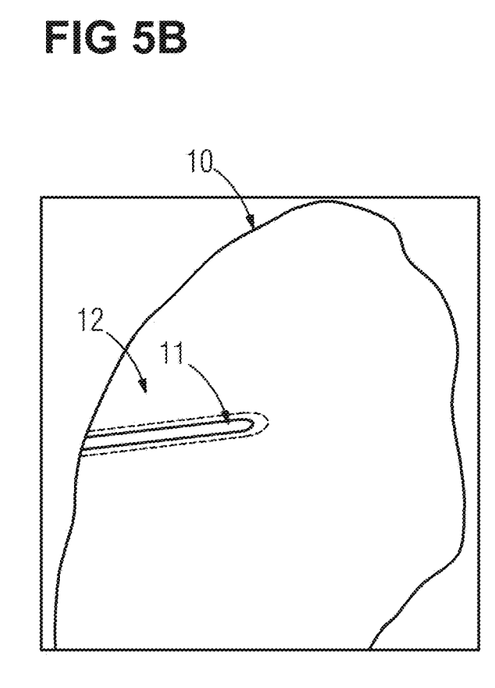

FIG. 5 shows a schematic representation of an exemplary bSSFP signal formation around a paramagnetic needle 11 for bSSFP-based sequences without a white-marker gradient GWM.

What is shown is a signal formation around a paramagnetic needle 11 for bSSFP-based sequences without a white-marker gradient GWM. Similarly to FIG. 4, a section through a tissue 12 with a needle 11 is shown schematically. Thanks to the needle 11, a locally alternating phase is induced in the tissue 12 at the echo time TE, represented by the circles containing the indicators. This is manifested as signal loss around the needle 11 if the alternating phase of the magnetization inside the same voxel V1, V2 is removed. The image contrast for this case is shown in the MRI scan 10 of the object under examination 4.

Figure 6A:
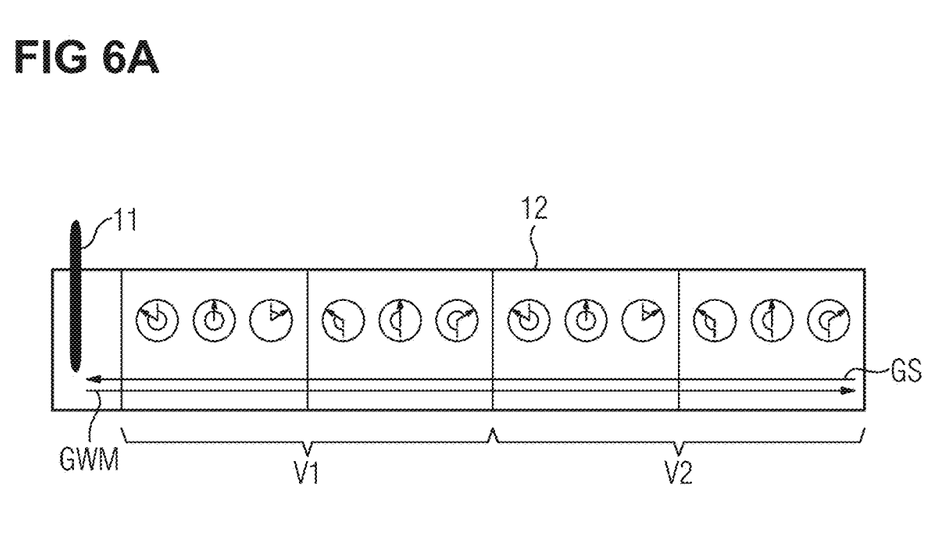
Figure 6B:
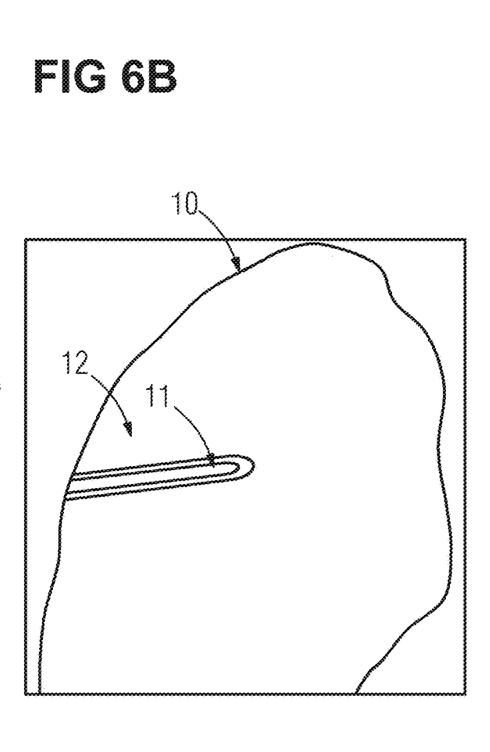

FIG. 6 shows a schematic representation of an exemplary bSSFP signal formation around a paramagnetic needle 11 for bSSFP-based sequences with a white-marker gradient GWM.

What is shown is a signal formation around a paramagnetic needle 11 for bSSFP-based sequences with a white-marker gradient GWM. Using a white-marker gradient, GWM can partially refocus the phase of the protons inside the voxels V1, V2 and thus restore the signal. A typical WM contrast is formed in the MRI scan 10. In this case, the image contrast is shown in the mapping of the object under examination 4.

The dephased MRI enables an image contrast to be generated, enhancing magnetic-field-changing objects such as paramagnetic interventional objects, such as biopsy needles 11 or catheters. This is achieved, for example, by using additional so-called "white-marker (WM)" gradients or white-marker gradients GWM. Objects with a susceptibility different from the tissue 12 interfere with the magnetic field locally and cause local interference gradients GS in the magnetic field. These result in a signal loss around the object because of the dephasing of the local magnetization. Applying the additional white-marker gradients, GWM causes magnetization dephasing in tissue 12 with a homogeneous magnetic field B0 but can partially counter the dephasing induced by the magnetic-field-changing object. This results in a contrast characterized by signal-intensive regions around the magnetic-field-changing object and a dark, dephased background further away from the source of interference.

The signal loss in the vicinity of magnetic-field-changing objects can be countered with a white-marker gradient. Introducing the additional white-marker gradient GWM causes an at least partial rephasing of the magnetization around the magnetic-field-changing object. Dephased bSSFP has in the past been used for the localization of objects in interventional MRI. Since bSSFP, in general, has a higher signal-to-noise ratio than GRE and the magnetization rephasing around magnetic-field-changing objects does not depend on the gradient polarity because of the symmetrical alternating phase behavior, it can be regarded as advantageous in respect of these aspects compared to dephased GRE.

Figure 7A:
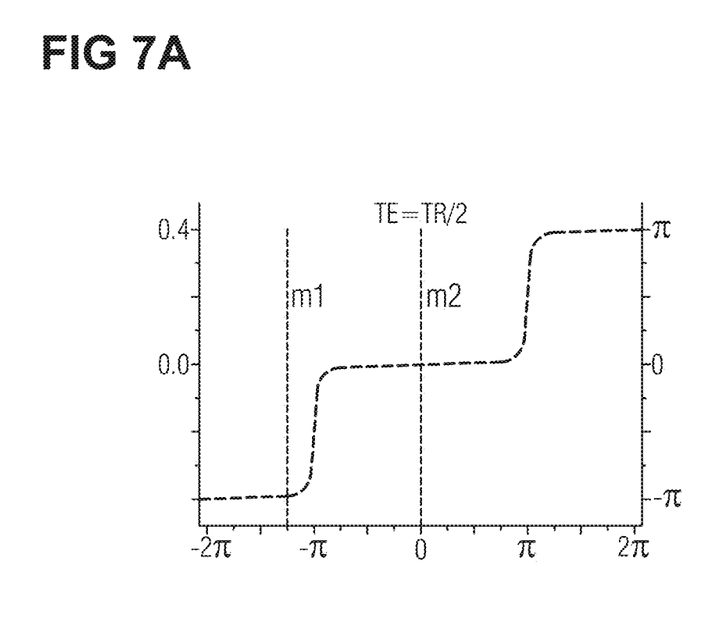
Figure 7B:
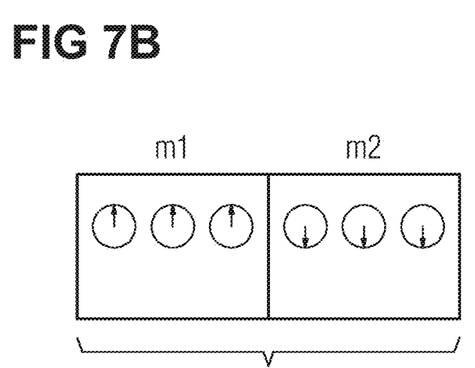
Figure 7C:
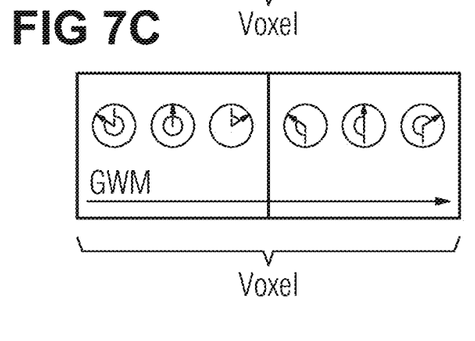

FIG. 7 shows a schematic representation of an exemplary analysis of the signal formation in the dephased bSSFP at interfaces.

FIG. 7b), c) shows an interface where a first material m1 adjoins a second material. A voxel Voxel can be assigned to a volume element where both materials m1 and m2 may be situated. For example, the materials m1, m2 can be fat and adjoining tissue 12. If during the repetition time TR a phase difference phi between fat and adjoining tissue 12 (for example, muscle) develops, i.e., in the range $(2*n-1)*pi<phi<2*n*pi$ where n is natural, the magnetization at the echo time TE is refocused with a phase difference of 180 degrees across the tissue interface (FIG. 7a)). The diagram shows the phase at TE against the phase progress per TR. This can result in a signal decay because of phase cancellation in the voxel Voxel which contains the tissue boundary (FIG. 7b)). The white-marker gradient GWM can partially rephase the magnetization at the tissue interface, increasing the signal (FIG. 7c)).

Since the resonance frequencies of fat and water are separated from one another by a chemical shift of approximately 3.5 ppm, the magnetization in the different tissue types can form an echo with an opposite phase in each case since the relative phase shift between both the tissue types causes them to fall into different phase bands. This occurs for all values of the repetition times TR, resulting in a phase difference between fat and adjoining tissue 12 (for example, muscle) of (2*n−1)*pi<phi<2*n*pi, where n is natural. The effect results in an increased signal intensity at the interfaces of the fat tissue 12 since the white-marker gradient GWM has a rephasing effect at these interfaces, comparable to the effect in the vicinity of the metal device.

Figure 8A:
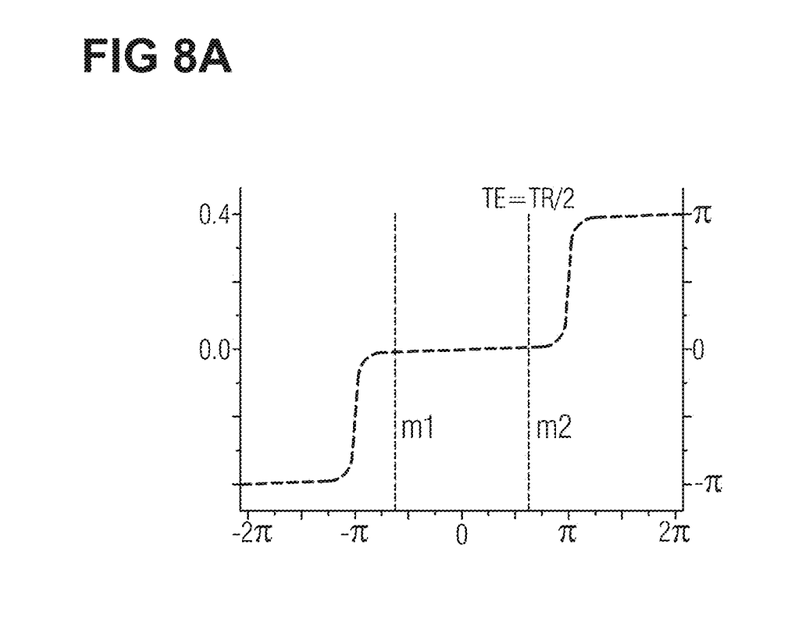
Figure 8B:
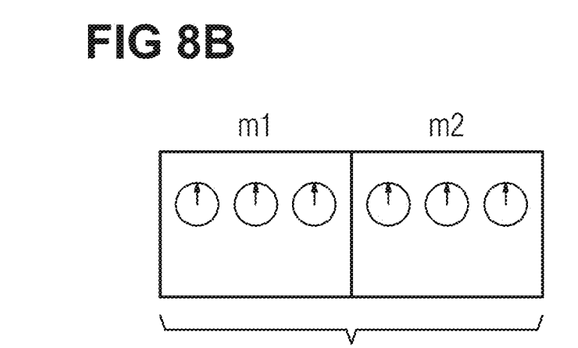
Figure 8C:
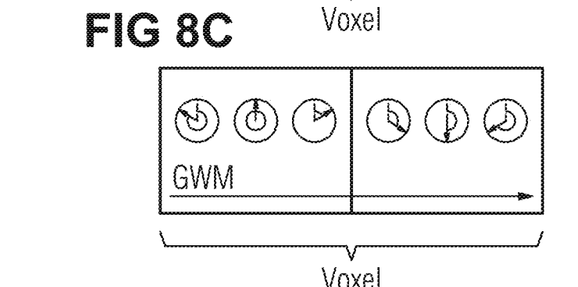

FIG. 8 shows a schematic representation of an exemplary analysis of the signal formation in the dephased bSSFP at fat tissue 12 interfaces.

Thanks to the adjustment, the sequence can be adjusted so that the phase development for the magnetization of the fat tissue 12 and the adjoining tissue 12 is deliberately changed such that the magnetization at the interfaces of the fat tissue 12 is refocused with the same phase.

To achieve this, a scanner frequency, i.e., the frequency to which the receiver/transmitter is tuned, can, for example, intentionally be adjusted so that fScanner=0.5*(fLarmor, m1+fLarmor,m2). The location of the Larmor frequencies of the materials m1 and m2 in the band structure is shown in FIG. 8a). The diagram shows the phase at TE against the phase progress per TR. By selecting the scanner frequency in this way instead of selecting the water frequency as the scanner frequency by default, the phase shift for the magnetization in the first material has the same value with an opposite sign as for the magnetization from the second material, and the magnetization at the interfaces is refocused with the same phase. Consequently, the white-marker gradient GWM has a dephasing effect instead of a rephasing effect on the magnetization, and the signal strength is suppressed.

By shifting the scanner frequency to fScanner=0.5*(fLarmor,m1+fLarmor,m2) the phase shift for the magnetization in the fat tissue 13, for example, has the same value with an opposite sign as for the magnetization from the other tissue 12. As a result, the magnetization of the protons across the interface is refocused in the voxel Voxel with the same phase (FIG. 8b)). Consequently, the white-marker gradient GWM has a dephasing effect instead of a rephasing effect on the magnetization, and the signal strength of the signal of the voxel shown is suppressed (FIG. 8c)).

Figure 9A:
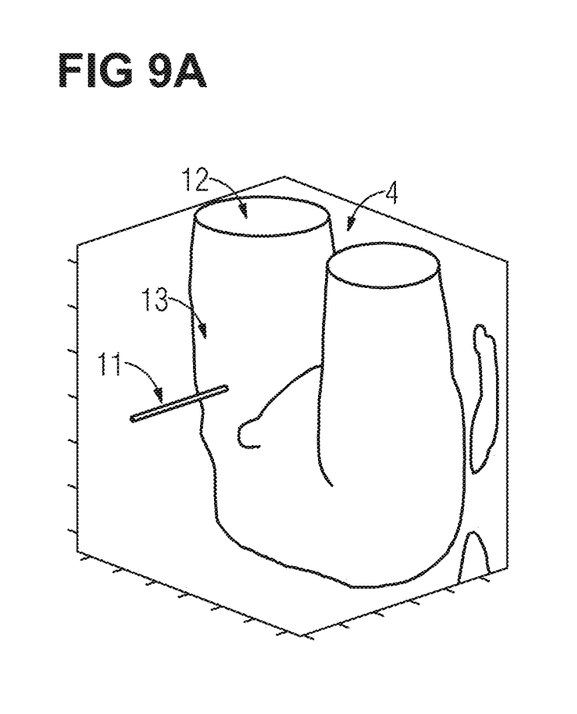
Figure 9B:
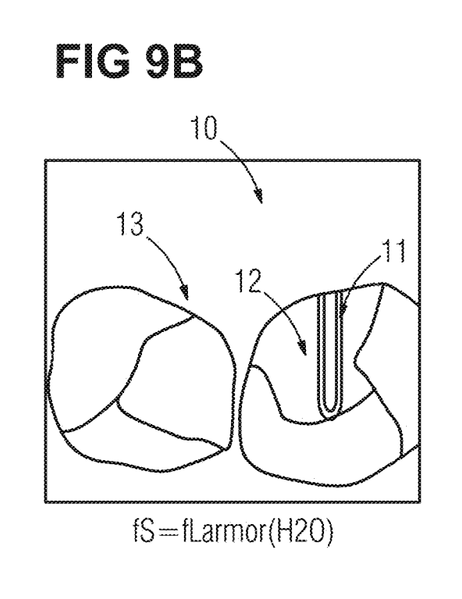
Figure 9C:
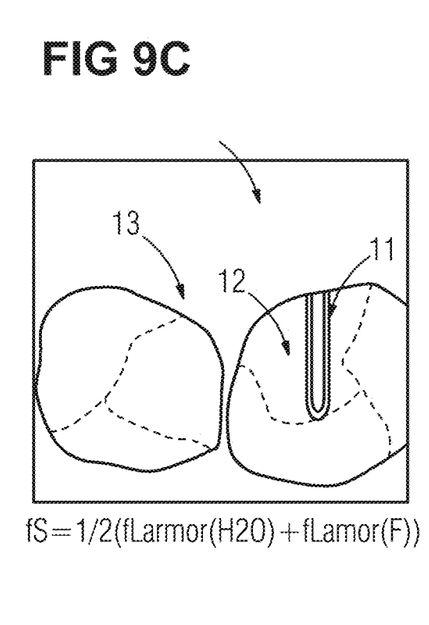

FIG. 9 shows a schematic representation of an exemplary simulation of a virtual human phantom containing a virtual paramagnetic needle 11.

Using a virtual human phantom, which contains a virtual paramagnetic needle 11, Bloch simulations were performed to generate a phase-shifted bSSFP contrast, as has been used in the literature for needle tracking.

Two images were generated using a sequence based on the dephased bSSFP readout diagram from FIG. 3. FIG. 9b) shows the contrast with the scanner frequency fScanner, centered on the water's Larmor frequency. FIG. 9c) shows the contrast with fScanner=0.5*(fLarmor,fat+fLarmor,water). This means that the magnetization at the interfaces of the fat tissue 12 is refocused with the same phase at TE. The white-marker gradient GWM results in a homogeneous dephasing across the voxels V1, V2 at the fat tissue 12 interface, and no additional signal intensity is caused.

FIG. 9a) shows the virtual human phantom. A transversal section from the simulated dataset that contains the needle 11 is shown in FIG. 9b). It can be seen how the contrast procedure enhances the area surrounding the needle 11, which is desirable. But a high signal can also be seen at the interfaces to the fat tissue 13, which is not desirable. A further transversal section from the simulated dataset that contains the needle 11 is shown in FIG. 9c). The scanner frequency has been deliberately changed from fScanner=fLarmor,m1 to fScanner=0.5*(fLarmor,m1+fLarmor,m2). This means that the magnetization in the fat and in the adjoining tissue 12 is refocused with the same phase at TE, so that the white-marker gradient GWM removes the signal at the interfaces and suppresses the intensity. A remaining signal at the interfaces may be traced back to a partial volume effect. Consequently, the needle 11 is more clearly visible.

Figure 10:
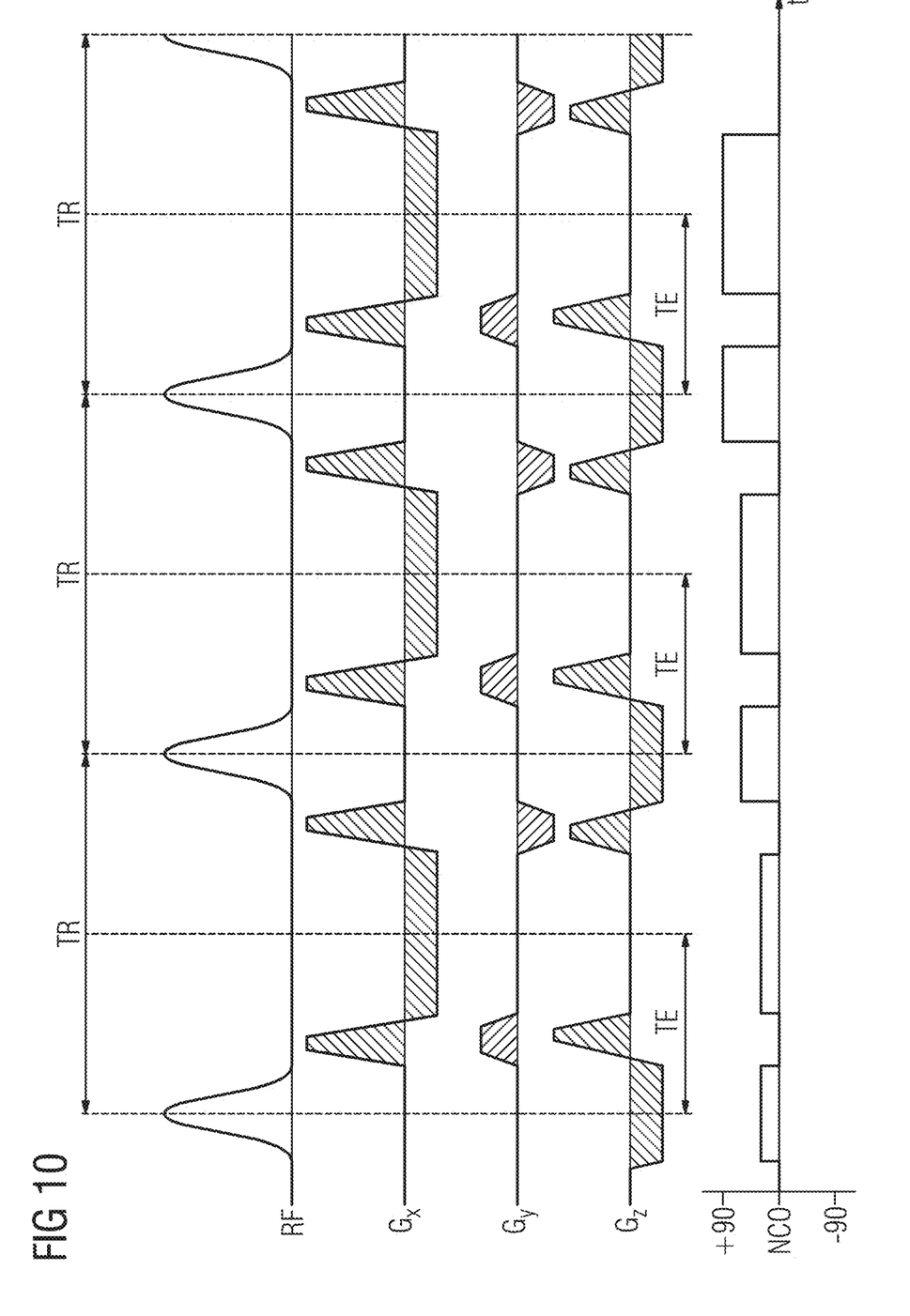
FIG. 10 shows a schematic representation of an exemplary dephased bSSFP sequence.

FIG. 10 shows a schematic representation of an exemplary dephased bSSFP sequence with an additional phase progress D. So that a dephased bSSFP is provided, in contrast to a normal bSSFP, an additional GWM moment can be introduced. This can, for example, happen in that a rephasing lobe of the slice selection gradient Gz is not precisely ½× as large as the slice selection gradient applied during the RF pulse. If, for example, a larger moment is chosen, as marked in FIG. 10, this must also be rebalanced at the end of TR by a slice selection prephaser lobe.

In the prior art, it is common to change the NCO phase (Numerically Controlled Oscillator) by 180 degrees so that it, for example, alternates between +90 degrees and −90 degrees. In the method described, the change in the NCO phase per repetition time can deviate from 180 degrees to not alternate between +90 degrees and −90 degrees.

Instead of changing the scanner frequency, it can be provided to change the phase cycle of the bSSFP RF pulses to achieve the same goal of shifting the bSSFP band structure relative to the fat and water resonances.

A standard bSSFP sequence uses a phase shift of 180°/TR to position the water resonance in the center of the central band, assuming that the scanner frequency is tuned to the water frequency.

If the scanner frequency is set to the water resonance, which by default is the case in a standard frequency calibration, and applies an additional phase progress of ((fLarmor,fat−fLarmor,water)/2)*TR*360° from pulse to pulse, the resonances of both the materials are inserted symmetrically into the band structure.

In the case of a dephased bSSFP, an undesirable signal can originate from fat tissue interfaces 13, which can be traced back to the above-described signal formation mechanism in bSSFP imaging. This additional signal size can be suppressed using the proposed approach.

As a result, multiple advantages arise.

Clearer image contrast can be enabled, as a result of which the visibility of the magnetic-field-changing object can be improved. This is, for example, advantageous for the specific application of object localization, in particular, if either only adversely affected image data is used for fast undersampled image acquisition or machine learning is to be used for automatic needle localization. The additional size caused by the fat tissue interfaces increases the image's complexity and, consequently, the localization tasks complexity. Hence, if it is not suppressed, it has a negative effect on the precision of localization.

The solution enables full flexibility in selecting the repetition time TR since the accumulated phase difference between fat tissue 13 and other tissue 12 becomes irrelevant thanks to the approaches provided.

The repetition time TR would be selected for a robust signal generation in a fully balanced sequence. Therefore, a repetition time TR would have to be selected, which removes the fat and water resonances from the dark bSSFP stop-bands. However, this is not necessary for "dephased bSSFP." In regions that are remote from the magnetic-field-changing object, the signal should, in any case, be suppressed with the help of the white-marker gradients GWM so that it is irrelevant whether the stop bands are reached. In the vicinity of the magnetic-field-changing objects, many stop-bands and pass-bands will fall into a voxel V1, V2 because of the large BO inhomogeneity, wherein the repetition time TR is irrelevant since it always generates an intra-voxel V1, V2 averaging effect across the band structure in the regions around the object that are relevant to the WM signal.

There thus remains flexibility in the selection of the repetition time TR. Using a fat suppression technique could mean that the phase-shifted signal disappears at the interfaces of water and fat. However, this would be counterproductive if the object passes through fat tissue 13 since no WM contrast can arise here if the fat signal is suppressed overall.

The proposed solutions enable a significantly more elegant solution.

It can be assumed that the effect of the undesirable signal rephasing can also play a role in dephased GRE imaging. In contrast to dephased bSSFP, with the proposed method, this undesirable signal cannot be suppressed, so with the proposed method, the dephased bSSFP is theoretically the better technique.

Thanks to this disclosure, a significant improvement is achieved in the contrast generated by dephased bSSFP at interfaces between fat tissue 13 and adjoining tissue 12, which normally oscillate close to the water resonance frequency.

The invention claimed is:

1. A method for capturing magnetic resonance image data of an object under examination using a magnetic resonance apparatus, the method comprising:
    performing a balanced steady-state free precession sequence with a phase progress of 180 degrees per repetition time using the magnetic resonance apparatus;
    in the balanced steady-state free precession sequence, providing a white-marker gradient in order at least partially to balance a dephasing caused by a magnetic-field-changing object in the object under examination;
    capturing image data of the object under examination using the magnetic resonance apparatus at an echo time; and
    adjusting a phase development between a phase of a magnetization of a first material and a phase of a magnetization of a second material, which form an interface in the object under examination, in the balanced steady-state free precession sequence using the magnetic resonance apparatus, wherein due to the adjusting of the phase development prior to an effect of the white-marker gradient, a co-phasal alignment of a magnetization of the first material and of the second material at the interface is effected at the echo time.

2. A magnetic resonance apparatus for capturing magnetic resonance image data of an object under examination, wherein the magnetic resonance apparatus is configured to:
    provide a balanced steady-state free precession sequence with a phase progress of 180 degrees per repetition time;
    in the balanced steady-state free precession sequence, provide a white-marker gradient in order at least partially to balance a dephasing caused by a magnetic-field-changing object in the object under examination;
    capture image data of the object under examination at an echo time; and
    adjust a phase development between a phase of a magnetization of a first material and a phase of a magnetization of a second material, which form an interface in the object under examination, in the balanced steady-state free precession sequence, wherein
    the adjustment of the phase development prior to an effect of the white-marker gradient effects a co-phasal alignment of a magnetization of the first material and of the second material at the interface at the echo time.

3. The method as claimed in claim 1, wherein the adjusting of the phase development comprises:
    setting a scanner frequency of the balanced steady-state free precession sequence, wherein the scanner frequency lies in a center between a Larmor frequency of the first material and a Larmor frequency of the second material.

4. The method as claimed in claim 1, wherein the adjusting of the phase development comprises:
    providing an additional phase progress per repetition time of the balanced steady-state free precession sequence, wherein the following applies for the additional phase progress of the balanced steady-state free precession sequence:

$$((f_{Larmor,m1} - f_{Larmor,m2})/2) * TR * 360°.$$

5. The method as claimed in claim 1, wherein the first material is fat and the second material is water.

6. The method as claimed in claim 1, wherein the first material is silicone and the second material is water.

7. A non-transitory computer program product comprising a computer program, which is loadable directly into a memory of a control facility of a magnetic resonance apparatus having program means to execute the steps of the method as claimed in claim 1, when the program is executed in the control facility of the magnetic resonance apparatus.

* * * * *